(12) United States Patent  (10) Patent No.: US 12,255,820 B2
Akkapeddi  (45) Date of Patent: Mar. 18, 2025

(54) PLATFORM AGNOSTIC GATEWAY FOR EFFICIENT DATA TRANSFER BETWEEN SYSTEMS

(71) Applicant: BANK OF AMERICA CORPORATION, Charlotte, NC (US)

(72) Inventor: Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 403 days.

(21) Appl. No.: 17/717,712

(22) Filed: Apr. 11, 2022

(65) Prior Publication Data

US 2023/0327992 A1    Oct. 12, 2023

(51) Int. Cl.
*H04L 47/12* (2022.01)

(52) U.S. Cl.
CPC .................................. *H04L 47/12* (2013.01)

(58) Field of Classification Search
CPC ...................................................... H04L 47/12
See application file for complete search history.

(56) References Cited

U.S. PATENT DOCUMENTS

| | | | |
|---|---|---|---|
| 7,464,178 B2 | 12/2008 | Corrigan et al. | |
| 7,685,304 B2 * | 3/2010 | Kothari | H04L 69/18 709/228 |
| 8,086,702 B2 | 12/2011 | Baum et al. | |
| 8,086,703 B2 | 12/2011 | Baum et al. | |
| 8,122,131 B2 | 2/2012 | Baum et al. | |
| 8,205,240 B2 | 6/2012 | Ansari et al. | |
| 8,209,400 B2 | 6/2012 | Baum et al. | |
| 8,713,132 B2 | 4/2014 | Baum et al. | |
| 8,819,178 B2 | 8/2014 | Baum et al. | |
| 8,825,871 B2 | 9/2014 | Baum et al. | |
| 8,996,665 B2 | 3/2015 | Baum et al. | |
| 9,047,753 B2 | 6/2015 | Dawes et al. | |
| 9,059,863 B2 | 6/2015 | Baum et al. | |
| 9,100,285 B1 | 8/2015 | Choudhury et al. | |
| 9,172,553 B2 | 10/2015 | Dawes et al. | |
| 9,306,809 B2 | 4/2016 | Dawes et al. | |
| 9,519,474 B2 | 12/2016 | Kurian et al. | |
| 9,529,630 B1 | 12/2016 | Fakhouri et al. | |
| 9,544,340 B2 | 1/2017 | Ezell | |

(Continued)

FOREIGN PATENT DOCUMENTS

EP    3259898 B1    7/2020

*Primary Examiner* — Donald L Mills

(57) ABSTRACT

An apparatus includes a memory and a processor. The memory stores information identifying a first set of protocols associated with communication channels available to a first system and a second set of protocols associated with communication channels available to a second system. The processor receives, from the first system, a request to transmit data, and selects, based at least on a size of the data and a load of each communication channel available to the first system, a protocol of the first set of protocols. The processor instructs the first system to transmit the data according to the selected protocol. The processor receives, over the communication channel associated with the selected protocol, the data from the first system. The processor further selects a protocol of the second set of protocols, and transmits, over the communication channel associated with the selected protocol, the data to the second system.

20 Claims, 2 Drawing Sheets

(56) References Cited

U.S. PATENT DOCUMENTS

| | | |
|---|---|---|
| 9,655,197 B1 | 5/2017 | Coombes et al. |
| 9,979,595 B2 | 5/2018 | Choudhury et al. |
| 10,051,078 B2 | 8/2018 | Burd et al. |
| 10,062,245 B2 | 8/2018 | Fulker et al. |
| 10,079,839 B1 | 9/2018 | Bryan et al. |
| 10,091,014 B2 | 10/2018 | Dawes et al. |
| 10,127,801 B2 | 11/2018 | Raji et al. |
| 10,210,058 B1 | 2/2019 | Srinath et al. |
| 10,237,237 B2 | 3/2019 | Dawes et al. |
| 10,375,253 B2 | 4/2019 | Dawes |
| 10,389,736 B2 | 8/2019 | Dawes et al. |
| 10,423,309 B2 | 9/2019 | Kitchen et al. |
| 10,484,512 B2 | 11/2019 | Pai et al. |
| 10,530,839 B2 | 1/2020 | Kitchen et al. |
| 10,666,523 B2 | 5/2020 | Dawes et al. |
| 10,930,136 B2 | 2/2021 | Baum et al. |
| 10,992,784 B2 | 4/2021 | Decenzo et al. |
| 10,999,254 B2 | 5/2021 | Baum et al. |
| 11,089,122 B2 | 8/2021 | Dawes |
| 11,108,827 B2 | 8/2021 | Beckman et al. |
| 11,113,950 B2 | 9/2021 | Baum et al. |
| 11,146,637 B2 | 10/2021 | Kitchen et al. |
| 2013/0279334 A1* | 10/2013 | Xu .................. H04L 47/125 370/235 |
| 2016/0019763 A1 | 1/2016 | Raji et al. |
| 2016/0043951 A1* | 2/2016 | Srinivas .............. H04L 67/1027 370/392 |
| 2016/0164923 A1 | 6/2016 | Dawes |
| 2017/0054594 A1 | 2/2017 | Decenzo et al. |
| 2017/0064045 A1* | 3/2017 | Pai .................... H04W 4/70 |
| 2017/0070361 A1 | 3/2017 | Sundermeyer et al. |
| 2017/0070563 A1 | 3/2017 | Sundermeyer et al. |
| 2017/0118037 A1 | 4/2017 | Kitchen et al. |
| 2017/0155545 A1 | 6/2017 | Baum et al. |
| 2017/0244573 A1 | 8/2017 | Baum et al. |
| 2017/0257257 A1 | 9/2017 | Dawes et al. |
| 2017/0310500 A1 | 10/2017 | Dawes |
| 2017/0347283 A1 | 11/2017 | Kodaypak |
| 2018/0019890 A1 | 1/2018 | Dawes |
| 2018/0034942 A1* | 2/2018 | Jalil .................. H04L 41/0895 |
| 2018/0083831 A1 | 3/2018 | Baum et al. |
| 2018/0198841 A1 | 7/2018 | Chmielewski et al. |
| 2020/0068636 A1* | 2/2020 | Huang ................ H04W 88/12 |
| 2020/0160679 A9 | 5/2020 | Dawes et al. |
| 2020/0344133 A1 | 10/2020 | Dawes et al. |
| 2021/0092131 A1 | 3/2021 | Decenzo et al. |

* cited by examiner

PLATFORM AGNOSTIC GATEWAY FOR EFFICIENT DATA TRANSFER BETWEEN SYSTEMS

TECHNICAL FIELD

The present disclosure relates generally to multicomputer data transferring, and more particularly, to a platform agnostic gateway for efficient data transfer between systems.

BACKGROUND

A variety of different communication channels exist for data communications between systems. For example, data communications may occur through file transfer, via a webservice, or through direct database access, among other methods. At the same time, after a pair of systems agree upon a communication channel they typically rely exclusively upon that channel, despite any associated inefficiencies. For example, if a pair of systems relies exclusively on file transfer for communication, communication delays may occur when the file server belonging to one of the systems is overloaded.

SUMMARY

This disclosure contemplates a platform agnostic gateway that is designed to facilitate efficient data communication between systems registered with the gateway. The gateway stores information of the communication technologies (e.g., protocols, adaptors, etc.) available to each registered system. When a source system seeks to transmit data to a destination system, it transmits a message to the gateway, identifying itself and the data it is seeking to transmit. The gateway responds with a selected communication channel for the source system to use for the data transfer, having selected the channel based on the size and format of the data, the communication channels available to the source system, and load balancing considerations. The source system then transmits the data to the gateway using the selected communication channel. After receiving the data, the gateway dynamically selects a communication channel to use to transmit the received data to the destination system, based on similar considerations for the destination system as used in selecting the communication channel for the source system. In this manner, the gateway enables systems to transfer data to one another without a need for the two systems to have negotiated a communication method in advance. An embodiment of the gateway is described below.

According to an embodiment, an apparatus includes a memory and a hardware processor communicatively coupled to the memory, a first system, and a second system. The memory stores information identifying a first set of protocols, and information identifying a second set of protocols. Each protocol of the first set of protocols is associated with a communication channel of a set of communication channels available to the first system. Each protocol of the second set of protocols is associated with a communication channel of a set of communication channels available to the second system. The hardware processor receives, from the first system, a request to transmit a first piece of data. In response to receiving the request to transmit the first piece of data, the hardware processor selects, based at least on a size of the first piece of data and a load of each communication channel available to the first system, a first protocol of the first set of protocols. The hardware processor also instructs the first system to transmit the first piece of data according to the first protocol of the first set of protocols. The hardware processor additionally receives, over the communication channel associated with the first protocol of the first set of protocols, the first piece of data from the first system. The hardware processor also selects, based at least on the size of the first piece of data and a load of each communication channel available to the second system, a first protocol of the second set of protocols. The hardware processor further transmits, over the communication channel associated with the first protocol of the second set of protocols, the first piece of data to the second system.

The tool described in the present disclosure may be integrated into a practical application of a gateway that enables computationally efficient data communications between remote systems, by dynamically selecting communication channels for the communications, based on the type, size, and format of the data, as well as the current loading of the communication channels. Accordingly, certain embodiments help to ensure that data communication between a pair of systems remains possible despite the fact that one or more communication channels typically available to those systems may be overloaded or otherwise down. At the same time, by dynamically selecting the communication channels for a pair of systems to use to transfer data to one another, thereby avoiding any need for such systems to negotiate with one another to establish agreed upon communication channels, certain embodiments of the gateway provide technical improvements to such systems. In particular, certain embodiments conserve the processing and networking resources that would otherwise be expended by the systems on negotiations to establish agreed upon communication channels prior to initiating data communications with one another.

As another example, the tool described in the present disclosure may be integrated into a practical application of a gateway for use in data communications with edge systems. Because a goal underpinning the design of such systems is the improvement of communication response times, the timing efficiencies generated by the gateway dynamically selecting communication channels (e.g., dynamically selecting communication channels for which the associated communications are likely to proceed the quickest) may be particularly desirable for such systems.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
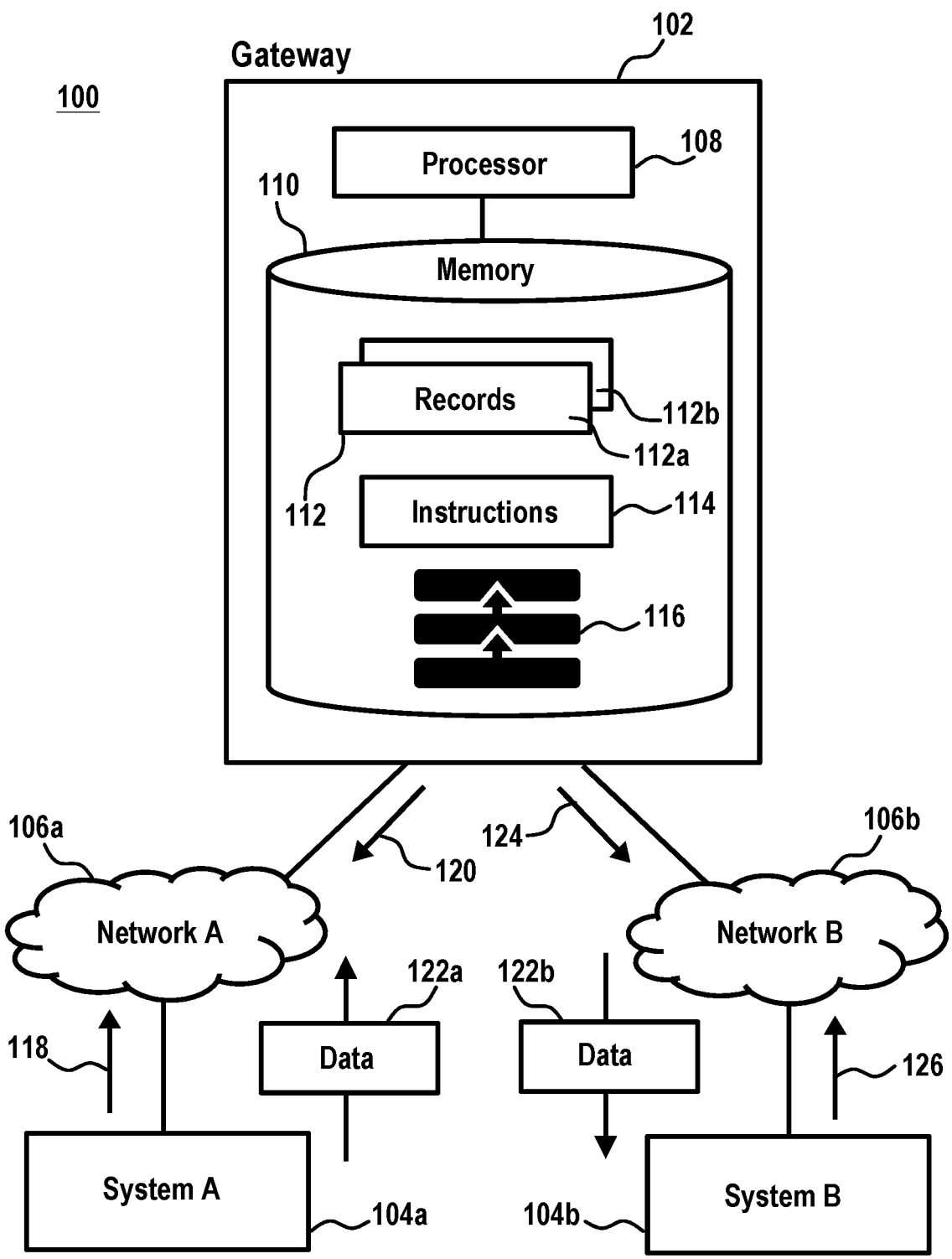
FIG. 1 illustrates an example platform agnostic gateway communication system.
Figure 2:
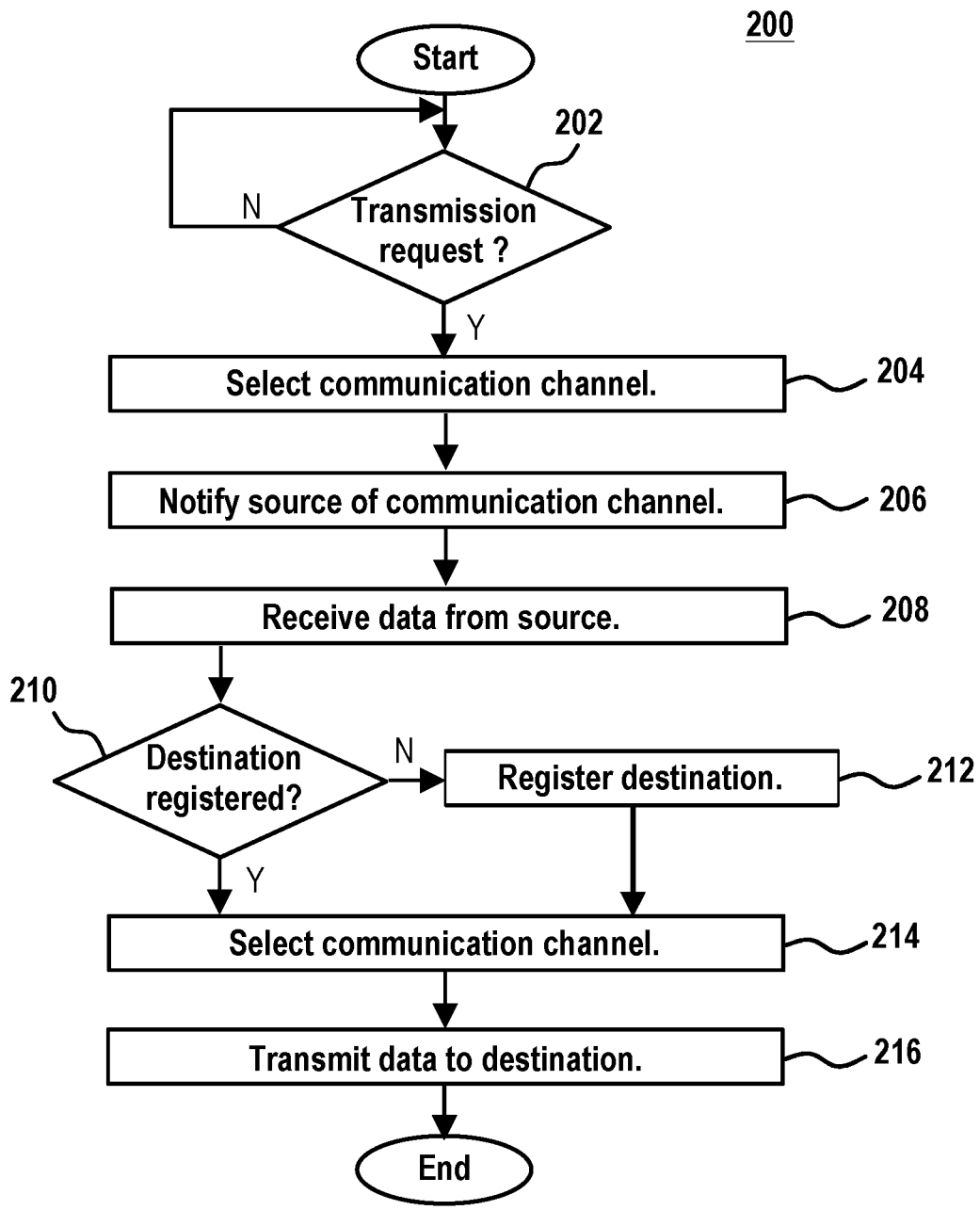
FIG. 2 presents a flowchart illustrating the manner by which the platform agnostic gateway of the system of FIG. 1 facilitates data communications between source and destination systems.

Embodiments of the present disclosure and its advantages may be understood by referring to FIGS. 1 and 2 of the drawings, like numerals being used for like and corresponding parts of the various drawings.

I. System Overview

FIG. 1 illustrates an example platform agnostic gateway communication system 100 that includes systems 104a and 104b, networks 106a and 106b, and gateway 102. As illustrated in FIG. 1, for each system 104a and 104b that is registered with gateway 102, the gateway stores a record 112a/b that identifies the system and the communication channels available to the system. In general, gateway 102 is configured to facilitate data communication between registered systems 104a/b. In particular, when a given source system 104a seeks to transmit data to a destination system 104b, the source system sends gateway 102 a message 118, identifying itself and the data for transmission. The gateway then selects a communication channel for the source system 104a to use to transmit the data to the gateway, and transmits a message 120 to the source system, notifying it of the selected communication channel. The source system 104a then transmits the data 122a to the gateway 102 using the selected communication channel. After receiving the data from the source system 104a, the gateway dynamically selects a communication channel to use to transmit the data to the destination system 104b, and then uses the selected communication channel to transmit the data 122b to the destination system 104b. Further details of the manner by which gateway 102 performs these tasks are presented below, and in the discussion of FIG. 2.

Systems 104a and 104b are any systems that are configured to transmit data over a network. For example, one or more of systems 104a/b may include one or more file servers, web servers, databases, and/or other technologies for generating, storing, and/or communicating information. In certain embodiments, one or more of systems 104a and 104b may be an edge computing system. Such a system 104a may correspond to a single edge node or to multiple edge nodes distributed over network 106a/b.

Each system 104a/b may be associated with one or more communication channels. For example, system 104a/b may be configured to transmit data via file transfer, a web service, database calls, and/or in any other suitable manner. In certain embodiments, one or more of systems 104a and 104b may be configured to communication by subscribing to a queue. For example, system 104a may send data to the queue, and system 104b may subscribe to the queue and access the data sent by system 104b by reading messages from the queue. For each communication channel available to system 104a/b, the system includes one or more technologies associated with the communication channel. For example, system 104a/b may include one or more communication protocols, such as the file transfer protocol (FTP), transmission control protocol (TCP), user datagram protocol (UDP), tabular data stream (TDS), Open DataBase Connectivity (ODBC), Java DataBase Connectivity (JDBC), and/or any other suitable protocol. While FIG. 1 illustrates a pair of systems 104a and 104b communicating with one another via gateway 102, this disclosure contemplates that any number of systems 104 may communicate with one another via gateway 102.

Each of systems 104a and 104b is configured to communicate with gateway 102. For example, when system 104a seeks to transmit data 122a to system 104b, system 104a first transmits a message 118 to gateway 102, identifying itself to the gateway, and informing the gateway that it wishes to transmit data 112a. Message 118 may include any suitable information that may be used by gateway 102 in selecting a suitable communication channel for the data transmission. For example, in certain embodiments, message 118 may include properties of the data such as the size of the data, the type of the data, and/or the format of the data. In some embodiments, message 118 may also include an identifier of the destination for the data (e.g., system 104b). As another example, after gateway 102 has selected a communication channel for system 104a to use to transmit data 122a to the gateway, gateway 102 transmits a message 120 to system 104a identifying the selected communication channel. Message 120 may include any suitable information to identify the selected communication channel. For example, message 120 may include an identification of the protocol associated with the selected communication channel, according to which system 104a is to transmit the data 122a. As a further example, after selecting a communication channel for the data transmission, gateway 102 is configured to open the communication channel and to receive the data 122a transmitted by system 104a. Gateway 102 is also configured to open a communication channel with system 104b, and to transmit the received data 122b to system 104b using that communication channel.

In certain embodiments, one or more of systems 104a/b is configured to receive a request 124 from gateway 102 for registration information. For example, in response to receiving data 122a from system 104a, which is destined for system 104b, gateway 102 may determine that system 104b is not registered with the gateway. Accordingly, gateway 102 may transmit request 124 to system 104b requesting registration information. Gateway 102 may request any suitable registration information from system 104b. For example, in certain embodiments, gateway 102 may request information associated with the communication channels available to system 104b. Such information may take any suitable form. For example, in certain embodiments, such information may take the form of a list of communication protocols available to system 104b. In response to receiving registration request 124, system 104b is configured to transmit registration response 126 to gateway 102. Registration response 126 includes the information requested by gateway 102. Gateway 102 may then store this information as a record 112b assigned to system 104b, as described in further detail below.

Networks 106a and 106b facilitate communications between components of system 100 including, for example, systems 104a/b and gateway 102. Network 106a/b may include any interconnecting systems capable of transmitting audio, video, signals, data, messages, or any combination of the preceding. Network 106a/b may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable communication link, including combinations thereof, operable to facilitate communication between components of system 100.

In certain embodiments, networks 106a and 106b may correspond to the same network. For example, in certain embodiments, both network 106a and network 108b may correspond to the Internet. In some embodiments, networks 106a and 106b may correspond to different networks. For example, in certain embodiments, network 106a or 106b may correspond to an internal network belonging to an organization, and the other network may correspond to an external network. In some such embodiments, gateway 102 may be located on the organization's internal network, and may be used to help facilitate communications between internal systems 104 and external systems 104.

As illustrated in FIG. 1, platform agnostic gateway 102 includes processor 108 and memory 110. This disclosure contemplates processor 108 and memory 110 being configured to perform any of the functions of gateway 102 described herein. Generally, gateway 102 is configured to: (1) register systems 104a/b with the gateway, by generating a record 112a/b for each system 104a/b, which includes details of the communication channels available to the systems; (2) receive a request 118 from a source system 104a requesting to transmit data 122a to a destination system 104b; (3) select, based on (i) the properties of the data, such as its size, type, and/or format, (ii) the communication channels available to the source system 104a (as identified in record 112a), (iii) the current loads experienced by the available communication channels, and/or (iv) any other suitable factors, a communication channel for system 104a to use to transmit the data 122a; (4) receive data 122a from system 104a over the selected communication channel; (5) identify the destination for the data; (6) determine whether the destination system 104b is registered with the gateway, and, if it is not request and receive registration information, including information identifying the communication channels available to the destination system; (7) select, based on (i) the properties of the data, such as its size, type, and/or format, (ii) the communication channels available to the destination system 104b (as identified in record 112b), (iii) the current loads experienced by the available communication channels, and/or (iv) any other suitable factors, a communication channel to use to transmit the data 122b to destination system 104b; and (8) use the selected communication channel to transmit the data 122b to the destination system 104b. The manner by which platform agnostic gateway 102 performs these functions is described in further detail below, and in the discussion of FIG. 2.

Processor 108 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 110 and controls the operation of gateway 102. Processor 108 may be 8-bit, 16-bit, 32-bit, 64-bit or of any other suitable architecture. Processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 108 may include other hardware and software that operates to control and process information. Processor 108 executes software (e.g., instructions 114) stored on memory 110 to perform any of the functions described herein. Processor 108 controls the operation and administration of platform agnostic gateway 102 by processing information received from systems 104a and 104b, networks 106a and 106b, and/or memory 110. Processor 108 may be a programmable logic device, a microcontroller, a microprocessor, any suitable processing device, or any suitable combination of the preceding. Processor 108 is not limited to a single processing device and may encompass multiple processing devices.

Memory 110 may store, either permanently or temporarily, data, operational software, or other information/instructions 114 for processor 108. Memory 110 may include any one or a combination of volatile or non-volatile local or remote devices suitable for storing information. For example, memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 110, a disk, a CD, or a flash drive. In particular embodiments, the software may include one or more applications executable by processor 108 to perform one or more of the functions described herein.

As described above, memory 110 is also configured to store registration records 112 for the systems 104a/b registered with the gateway. Memory 110 may store any number of records 112, and records 112 may be added to memory 110 at any suitable time. For example, gateway 102 may store a new record 112a in response to receiving a registration request from a system 104a seeking to use gateway 102 to facilitate data transfers. As another example, gateway 102 may store a new record 112b in response to requesting registration information from a system 104b (e.g., from a system 104b to which a registered system 104a is attempting to transmit data 122a). Each record 112 may include any suitable information. For example, in certain embodiments, each record 112 stores an identifier that may be used by the gateway to identify the system. A source system 104a may include its own identifier in transmission requests 118, to identify itself to the gateway 102. A source system 104a may also include the identifier of the destination system 104b in transmission requests 118 and/or in the transmitted data 122a, itself, in order to identify the destination system 104b to the gateway 102.

As another example of the information that may be included in records 112, each record 112a/b may include information identifying the communication channels that are available to the corresponding system 104a/b. For instance, each record 112a/b may include a list of the communication protocols available to each system 104a/b. This disclosure contemplates that records 112 may be updated over time, for example, as new communication protocols become available to the systems 104a/b.

Memory 110 also stores a variety of different communication technologies 116 for use in facilitating communications between systems 104a/b. For example, communication technologies 116 may include multiple communication protocols and adaptors, such that gateway 102 is able to accept data/messages from a wide variety of different systems 104a/b. For example, communication technologies 116 may include protocols such as such as the file transfer protocol (FTP), transmission control protocol (TCP), user datagram protocol (UDP), tabular data stream (TDS), Open DataBase Connectivity (ODBC), Java DataBase Connectivity (JDBC), and/or any other suitable protocols. In certain embodiments, communication technologies 116 may include one or more custom connectors (e.g., Java/Dot-Net based connectors) that have been written for specialized communications. Communication technologies 116 may also include various Extract, Transform, Load (ETL) technologies for use in database access, storage, and retrieval. In certain embodiments, communication technologies 116 may include one or more technologies related to data security. For example, communication technologies 116 may include one or more cryptographic keys, one or more encryption algorithms, and/or any other suitable data security technologies that may be used to secure data 122*a/b* during transmission.

Instructions 114 include instructions used by gateway 102 in selecting communication channels to use for data transmissions between systems 104*a/b*. For example, in certain embodiments, instructions 114 may include a set of rules to be used by gateway 102 in selecting from amongst available communication channels. For instance, instructions 114 may indicate that certain communication channels should not be used if the size of the data is greater than a given threshold size. Similarly, instructions 114 may indicate that certain communication channels should not be used for certain formats of data. Instructions 114 may also include software that may be executed by processor 108 in order to measure the load of the available communication channels, and to select from amongst the available communication channels based on load-balancing considerations. For example, instructions 114 may indicate that gateway 102 is not to select a given communication channel when the load on that communication channel is greater than a set threshold. As another example, instructions 114 may indicate that gateway 102 is to select the communication channel associated with the lowest load, when several suitable communication channels are available.

As another example, in certain embodiments, instructions 114 may include instructions for transmitting large quantities of data efficiently. For example, instructions 114 may indicate that gateway 102 is to coordinate the transmission of large quantities of data using multiple different communication channels. In particular, instructions 114 may include instructions for (1) instructing the source system 104*a* to split up the data into a certain number of pieces, (2) notifying the source system of the communication channels that it should use to transmit the various pieces of the data to the gateway, (3) selecting multiple communication channels to use to transmit the received pieces of data to the destination system 104*b*, and (4) notifying the destination system 104*b* of the manner by which to reassemble the pieces of data.

In certain embodiments, instructions 114 may include one or more machine learning algorithms that may be used by gateway 102 in selecting appropriate communication technologies 116 for a given gateway-mediated data transfer. As an example, instructions 114 may include a machine learning algorithm that is trained to learn from the decisions made by gateway 102, to automatically select certain communication channels for particular systems 104*a/b*. As a specific example, the machine learning algorithm may be able to determine that a given communication channel is almost always selected when system 104*a* seeks to transmit data 122*a* to system 104*b* at a particular time of day. Accordingly, the machine learning algorithm may automatically select that communication channel when gateway 102 receives a request 118 from system 104*a* for data transmission to system 104*b* at that particular time of day. Instructions 114 may include any suitable machine learning algorithm. For example, instructions 114 may include a neural network algorithm, a decision tree algorithm, a naïve Bayes algorithm, a support vector machine algorithm, and/or any other suitable machine learning algorithm.

Modifications, additions, or omissions may be made to the systems described herein without departing from the scope of the invention. For example, system 100 may include any number of systems 104*a/b*, networks 106*a/b*, processors 108, memories 110, registration records 112, and communication technologies 116. The components may be integrated or separated. Moreover, the operations may be performed by more, fewer, or other components. Additionally, the operations may be performed using any suitable logic comprising software, hardware, and/or other logic.

II. Gateway Mediated Data Transmission

FIG. 2 presents a flowchart illustrating an example method 200 (described in conjunction with elements of FIG. 1) by which platform agnostic gateway 102 facilitates communication between systems 104*a* and 104*b*.

During operation 202 gateway 102 determines whether it has received a request 118 from a source system 104*a* to transmit data. If, during operation 202 gateway 102 determines that it has received a request 118 from a source system 104*a*, during operating 204 gateway 102 selects a communication channel for source system 104*a* to use in transmitting the data 122*a* to the gateway. In particular, gateway 102 accesses the record 112*a* associated with the source system 104*a* (for example, based on an identifier transmitted by source system 104*a* in request 118), and identifies the communication channels available to source system 104*a*. Gateway 102 then selects from amongst the communication channels available to source system 104*a* based on any suitable factors. For example, in certain embodiments, gateway 102 selects a communication channel for the data transmission from source system 104*a* based on properties of the data to be transmitted, such as its size, type, and/or format. In some embodiments, gateway 102 additionally or alternatively considers the loads experienced by the available communication channels, and selects a communication channel for the data transmission from source system 104*a* based on load-balancing considerations. For example, gateway 102 may reject communication channels for which the current load is greater than a threshold value, and/or select a communication channel for which the load is the least. In certain embodiments (for example, when the data to be transmitted is large), gateway 102 may be configured to select more than one communication channel for use in transmitting the data. After selecting a communication channel for the data transmission, during operation 206 gateway 102 transmits a message 120 to the source system 104*a*, notifying the source system of the selected communication channel. Gateway 102 may notify source system 104*a* of the selected communication channel in any suitable manner. For example, in certain embodiments, gateway 102 notifies source system 104*a* of the selected communication channel by notifying source system 104*a* of the communication protocol associated with the selected communication channel, according to which the source system 104*a* is to transmit the data 122*a*. In certain embodiments in which gateway 102 has selected more than one communication channel for use in transmitting the data, message 120 may additionally provide information to source system 104*a* of the manner by which the source system is to split up the data for transmission, such that a different piece of the data may be transmitted by each of the multiple selected communication channels.

During operation 208 gateway 102 opens the selected communication channel(s) and receives the data 122*a* transmitted by source system 104*a* over the selected communication channel (and according to the selected communication protocol). Gateway 102 next determines the destination system 104*b* to which the gateway is to transmit the data 122*a* received from the source system 104*a*. Gateway 102 may determine the destination system 104*b* in any suitable manner. For example, in certain embodiments, source system 104*a* may have identified the destination system 104*b* to gateway 102 in request 118. In some embodiments, gateway 102 may not be aware of the destination system 104*b* until after it has received the data 122a from source system 104a. For example, in certain embodiments, source system 104a may include an identification of the destination system 104b in the data transmission 122a, itself.

After determining the destination system 104b for the data transmission, during operation 210 gateway 102 determines whether the destination system 104b is registered with the gateway. For example, in certain embodiments, gateway 102 determines whether an identifier provided by source system 104a for the destination system 104b matches any of the records 112 stored in memory 110. If, during operation 210 gateway 102 determines that the destination system 104b is not registered with the gateway, during operation 212 gateway 102 registers the destination system 104b. In particular, gateway 102 transmit a registration request 124 to destination system 104b seeking registration information from the system, including, for example, information identifying the communication channels that are available to destination system 104b. Gateway 102 receives a response 126 from destination system 104b that includes such information, and generates a record 112b for destination system 104b in memory 110. Method 200 then proceeds to operation 214. If, during operation 210 gateway 102 determines that the destination system 104b is registered with the gateway (e.g., gateway 102 determines that a record 112b that is associated with destination system 104b is stored in memory 110), method 200 proceeds directly to operation 214.

During operation 214 gateway 102 selects a communication channel to use in transmitting the data received from source system 104a (as transmission 122a) to the destination system 104b. In particular, gateway 102 accesses the record 112b associated with the destination system 104b and identifies the communication channels available to destination system 104b. Gateway 102 then selects from amongst the available communication channels based on any suitable factors. For example, in certain embodiments, gateway 102 selects a communication channel for the data transmission to destination system 104b based on properties of the data to be transmitted, such as its size, type, and/or format. In some embodiments, gateway 102 additionally or alternatively considers the loads experienced by the available communication channels, and selects a communication channel for the data transmission to destination system 104b based on load-balancing considerations. For example, gateway 102 may reject communication channels for which the current load is greater than a threshold value, and/or select a communication channel for which the load is the least. In certain embodiments (for example, where the data for transmission is large), gateway 102 may be configured to select more than one communication channel for use in transmitting the data. For example, gateway 102 may be configured to select more than one communication channel for use in transmitting the data to the destination system 104b, where more than one communication channel was used to receive the data from the source system 104a.

After selecting one or more communication channels for the data transmission, during operation 216 gateway 102 transmits the data to destination system 104b, using the selected communication channel(s), as transmission 122b. In certain embodiments in which gateway 102 uses multiple communication channels to transmit the data to the destination system 104b, the gateway 102 may additionally transmit information to the destination system 104b, instructing the destination system on the manner by which it is to reassemble the data from the various received pieces.

This disclosure contemplates that the selection of the communication channel(s) to be used by the source system 104a to transmit the data 122a to the gateway 102 is independent of the selection of the communication channel(s) to be used by the gateway 102 to transmit the received data to the destination system 104b, such that the selected communication channels may be the same or different.

Modifications, additions, or omissions may be made to method 200 depicted in FIG. 2. Method 200 may include more, fewer, or other operations. For example, operations may be performed in parallel or in any suitable order. While discussed as platform agnostic gateway 102 (or components thereof) performing certain operations, any suitable components of system 100, including, for example, systems 104a/b, may perform one or more operations of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
    a memory configured to store:
        information identifying a first plurality of protocols supported by a first system, each protocol of the first plurality of protocols is associated with a communication channel of a first set of communication channels available to the first system; and
        information identifying a second plurality of protocols supported by a second system, each protocol of the second plurality of protocols is associated with a communication channel of a second set of communication channels available to the second system; and
    a hardware processor communicatively coupled to the memory, the first system, and the second system, the hardware processor configured to:
        receive, from the first system, a request to transmit a first piece of data; and
        in response to receiving the request to transmit the first piece of data:
            select, based at least on a size of the first piece of data and a load of each communication channel available to the first system, a first protocol of the first plurality of protocols supported by the first system;
            instruct the first system to transmit the first piece of data according to the first protocol of the first plurality of protocols;
            receive, over the communication channel associated with the first protocol of the first plurality of protocols, the first piece of data from the first system;
            select, based at least on the size of the first piece of data and a load of each communication channel available to the second system, a second protocol of the second plurality of protocols supported by the second system; and
            transmit, over the communication channel associated with the second protocol of the second plurality of protocols, the first piece of data to the second system.

2. The apparatus of claim 1, wherein the first protocol of the first plurality of protocols is different from the second protocol of the second plurality of protocols.

3. The apparatus of claim 1, wherein:
the memory is further configured to store an identifier assigned to the second system;
the first piece of data received from the first system comprises the identifier assigned to the second system; and
the hardware processor is further configured to determine, based on the presence of the identifier assigned to the second system in the first piece of data, that the first piece of data is destined for the second system.

4. The apparatus of claim 1, wherein the hardware processor is further configured to:
receive a registration request from a third system; and
in response to receiving the registration request:
receive information identifying a third plurality of protocols, each protocol of the third plurality of protocols associated with a communication channel of a third set of communication channels available to the third system; and
store the information identifying the third plurality of protocols in the memory.

5. The apparatus of claim 1, wherein:
the first plurality of protocols comprises the first protocol and a third protocol; and
selecting the first protocol of the first plurality of protocols comprises determining that the load of the communication channel associated with the third protocol of the first plurality of protocols is greater than the load of the communication channel associated with the first protocol of the first plurality of protocols.

6. The apparatus of claim 1, wherein the hardware processor is further configured to:
receive, from the first system, a request to transmit a second piece of data to a third system; and
in response to receiving the request to transmit the second piece of data:
select, based at least on a size of the second piece of data and the load of each communication channel available to the first system, a third protocol of the first plurality of protocols;
instruct the first system to transmit the second piece of data according to the third protocol of the first plurality of protocols;
receive, over the communication channel associated with the third protocol of the first plurality of protocols, the second piece of data from the first system;
determine that the third system is not registered;
in response to determining that the third system is not registered:
transmit a request to the third system for information identifying a third plurality of protocols available to the third system; and
receive the information identifying the third plurality of protocols, each protocol of the third plurality of protocols associated with a communication channel of a third set of communication channels available to the third system;
select, based at least on the size of the second piece of data and a load of each communication channel available to the third system, a fourth protocol of the third plurality of protocols; and
transmit, over the communication channel associated with the fourth protocol of the third plurality of protocols, the second piece of data to the third system.

7. The apparatus of claim 1, wherein the first set of protocols comprises a protocol associated with at least one of:
file server communications;
web server communications; and
database communications.

8. A method comprising:
receiving, from a first system, a request to transmit a first piece of data to a second system, wherein:
a first set of communication channels are available to the first system, each communication channel of the first set of communication channels associated with a protocol of a first plurality of protocols supported by the first system; and
a second set of communication channels are available to the second system, each communication channel of the second set of communication channels associated with a protocol of a second plurality of protocols supported by the second system; and
in response to receiving the request to transmit the first piece of data:
selecting, based at least on a size of the first piece of data and a load of each communication channel of the first set of communication channels, a first protocol of the first plurality of protocols supported by the first system;
instructing the first system to transmit the first piece of data according to the first protocol of the first plurality of protocols;
receiving, over the communication channel associated with the first protocol of the first plurality of protocols, the first piece of data from the first system;
selecting, based at least on the size of the first piece of data and a load of each communication channel of the second set of communication channels, a second protocol of the second plurality of protocols supported by the second system; and
transmitting, over the communication channel associated with the second protocol of the second plurality of protocols, the first piece of data to the second system.

9. The method of claim 8, wherein the first protocol of the first plurality of protocols is different from the second protocol of the second plurality of protocols.

10. The method of claim 8, wherein:
the first piece of data received from the first system comprises an identifier assigned to the second system; and
the method further comprises determining, based on the presence of the identifier assigned to the second system in the first piece of data, that the first piece of data is destined for the second system.

11. The method of claim 8, further comprising:
receiving a registration request from a third system; and
in response to receiving the registration request:
receiving information identifying a third plurality of protocols, each protocol of the third plurality of protocols associated with a communication channel of a third set of communication channels available to the third system; and
storing the information identifying the third plurality of protocols in a memory.

12. The method of claim 8, wherein:
the first plurality of protocols comprises the first protocol and a third protocol; and
selecting the first protocol of the first plurality of protocols comprises determining that the load of the communication channel associated with the third protocol of the first plurality of protocols is greater than the load of the communication channel associated with the first protocol of the first plurality of protocols.

13. The method of claim 8, further comprising:
receiving, from the first system, a request to transmit a second piece of data to a third system; and
in response to receiving the request to transmit the second piece of data:
  selecting, based at least on a size of the second piece of data and the load of each communication channel of the first set of communication channels, a third protocol of the first plurality of protocols;
  instructing the first system to transmit the second piece of data according to the third protocol of the first plurality of protocols;
  receiving, over the communication channel associated with the third protocol of the first plurality of protocols, the second piece of data from the first system;
  determining that the third system is not registered;
  in response to determining that the third system is not registered:
    transmitting a request to the third system for information identifying a third plurality of protocols available to the third system; and
    receiving the information identifying the third plurality of protocols, each protocol of the third plurality of protocols associated with a communication channel of a third set of communication channels available to the third system;
  selecting, based at least on the size of the second piece of data and a load of each communication channel of the third set of communication channels, a first protocol of the third plurality of protocols; and
  transmitting, over the communication channel associated with the fourth protocol of the third plurality of protocols, the second piece of data to the third system.

14. The method of claim 8, wherein the first plurality of protocols comprises a protocol associated with at least one of:
  file server communications;
  web server communications; and
  database communications.

15. A non-transitory computer-readable medium comprising instructions that, when executed by a hardware processor, cause the processor to:
  receive, from a first system, a request to transmit a first piece of data to a second system, wherein:
    a first set of communication channels are available to the first system, each communication channel of the first set of communication channels associated with a protocol of a first plurality of protocols supported by the first system; and
    a second set of communication channels are available to the second system, each communication channel of the second set of communication channels associated with a protocol of a second plurality of protocols supported by the second system; and
  in response to receiving the request to transmit the first piece of data:
    select, based at least on a size of the first piece of data and a load of each communication channel of the first set of communication channels, a first protocol of the first plurality of protocols supported by the first system;
    instruct the first system to transmit the first piece of data according to the first protocol of the first plurality of protocols supported by the second system;
    receive, over the communication channel associated with the first protocol of the first plurality of protocols, the first piece of data from the first system;
    select, based at least on the size of the first piece of data and a load of each communication channel of the second set of communication channels, a second protocol of the second plurality of protocols supported by the second system; and
    transmit, over the communication channel associated with the second protocol of the second plurality of protocols, the first piece of data to the second system.

16. The non-transitory computer-readable medium of claim 15, wherein the first protocol of the first plurality of protocols is different from the second protocol of the second plurality of protocols.

17. The non-transitory computer-readable medium of claim 15, wherein:
  the first piece of data received from the first system comprises an identifier assigned to the second system; and
  the instructions, when executed by the hardware processor, further cause the processor to determine, based on the presence of the identifier assigned to the second system in the first piece of data, that the first piece of data is destined for the second system.

18. The non-transitory computer-readable medium of claim 15, wherein the instructions, when executed by the hardware processor, further cause the processor to:
  receive a registration request from a third system; and
  in response to receiving the registration request:
    receive information identifying a third plurality of protocols, each protocol of the third plurality of protocols associated with a communication channel of a third set of communication channels available to the third system; and
    store the information identifying the third plurality of protocols in a memory.

19. The non-transitory computer-readable medium of claim 15, wherein:
  the first plurality of protocols comprises the first protocol and a third protocol; and
  selecting the first protocol of the first plurality of protocols comprises determining that the load of the communication channel associated with the third protocol of the first plurality of protocols is greater than the load of the communication channel associated with the first protocol of the first plurality of protocols.

20. The non-transitory computer-readable medium of claim 15, wherein the first plurality of protocols comprises a protocol associated with at least one of:
  file server communications;
  web server communications; and
  database communications.

* * * * *